April 8, 1947. F. CARTLIDGE 2,418,573
MATERIAL GATHERING AND LOADING MACHINE
Original Filed Aug. 2, 1943 8 Sheets-Sheet 2

INVENTOR
Frank Cartlidge
Clarence F. Poole
ATTORNEY

April 8, 1947.  F. CARTLIDGE  2,418,573
MATERIAL GATHERING AND LOADING MACHINE
Original Filed Aug. 2, 1943  8 Sheets-Sheet 3
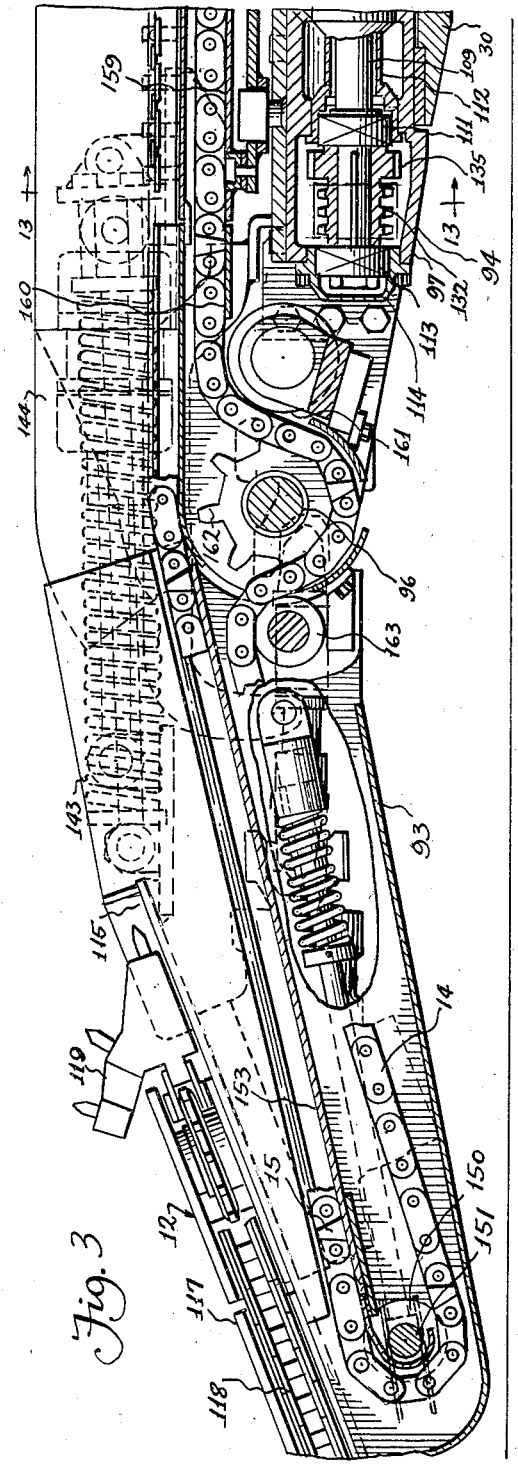
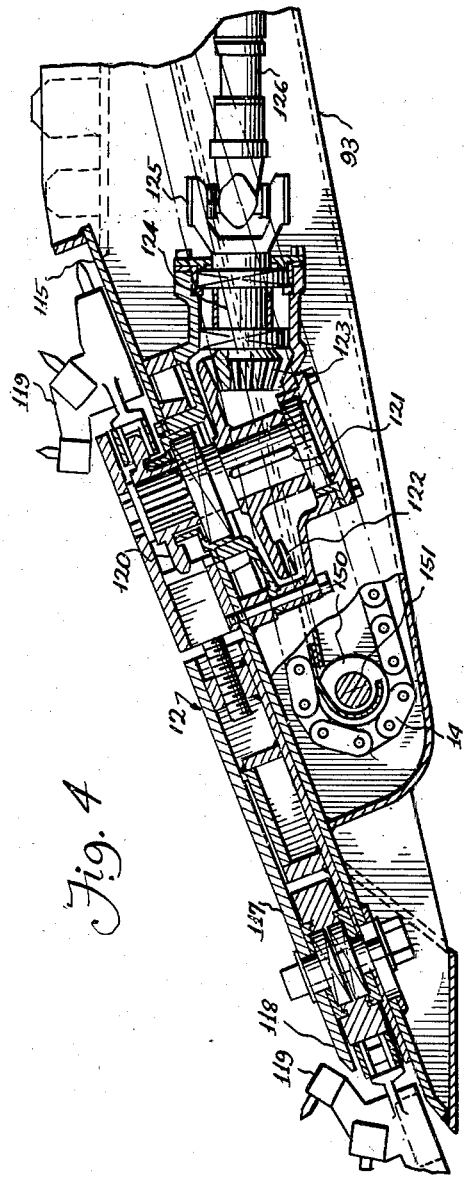
INVENTOR
Frank Cartlidge
Clarence F. Poole
ATTORNEY

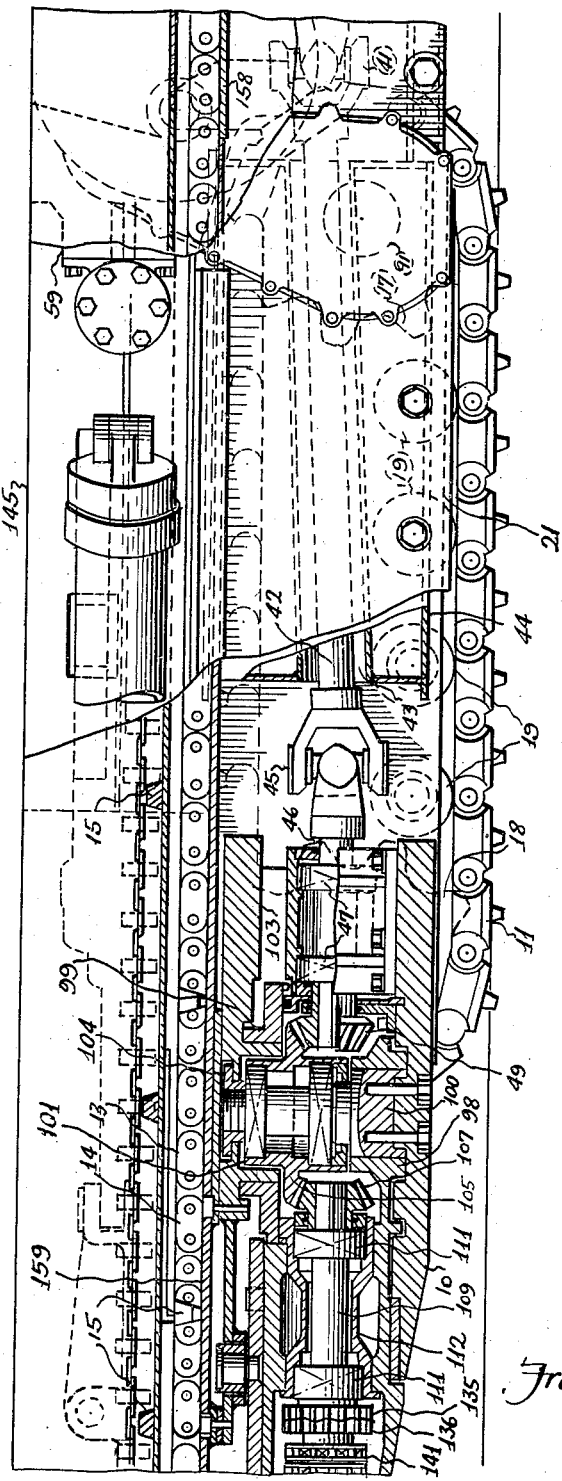

April 8, 1947.  F. CARTLIDGE  2,418,573
MATERIAL GATHERING AND LOADING MACHINE
Original Filed Aug. 2, 1943  8 Sheets-Sheet 5
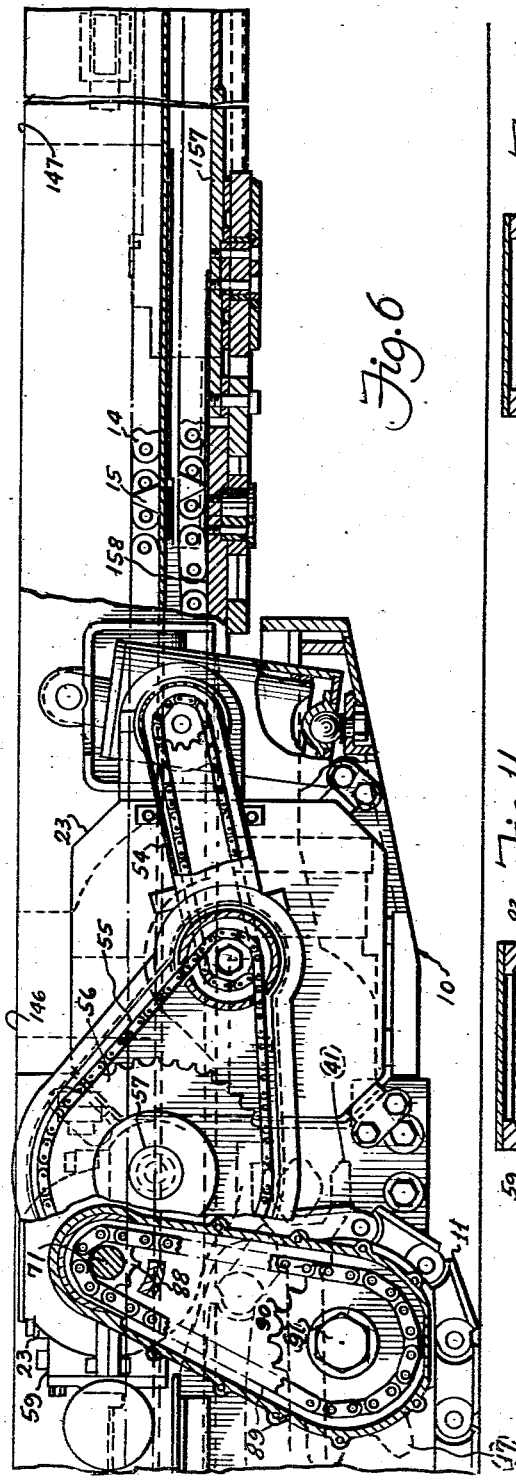
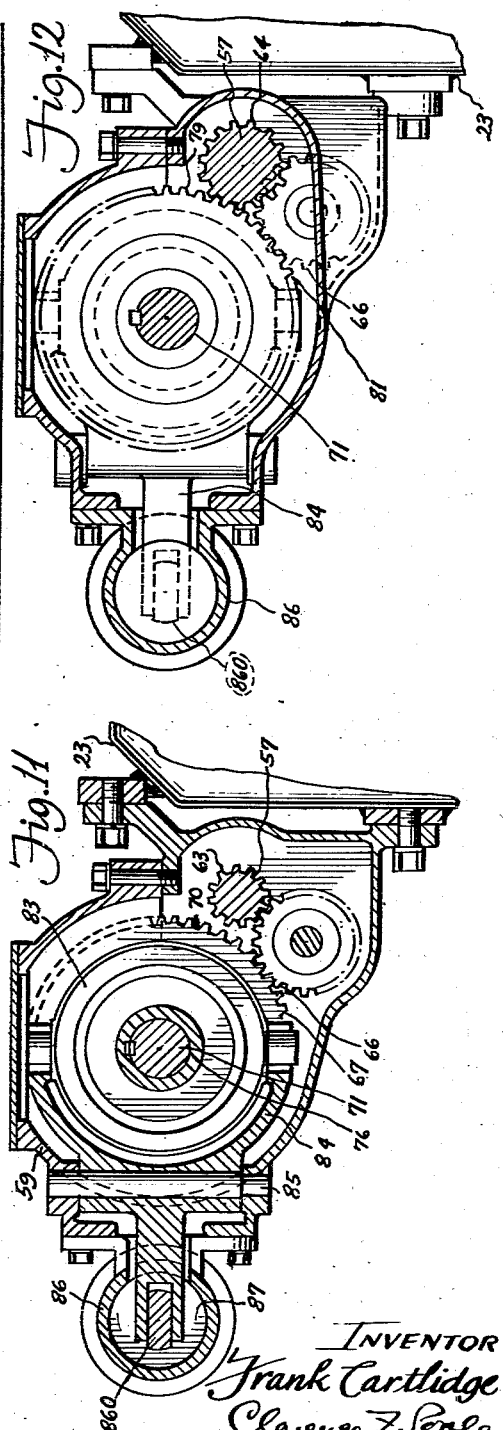
INVENTOR
Frank Cartlidge
Clarence F. Poole
ATTORNEY

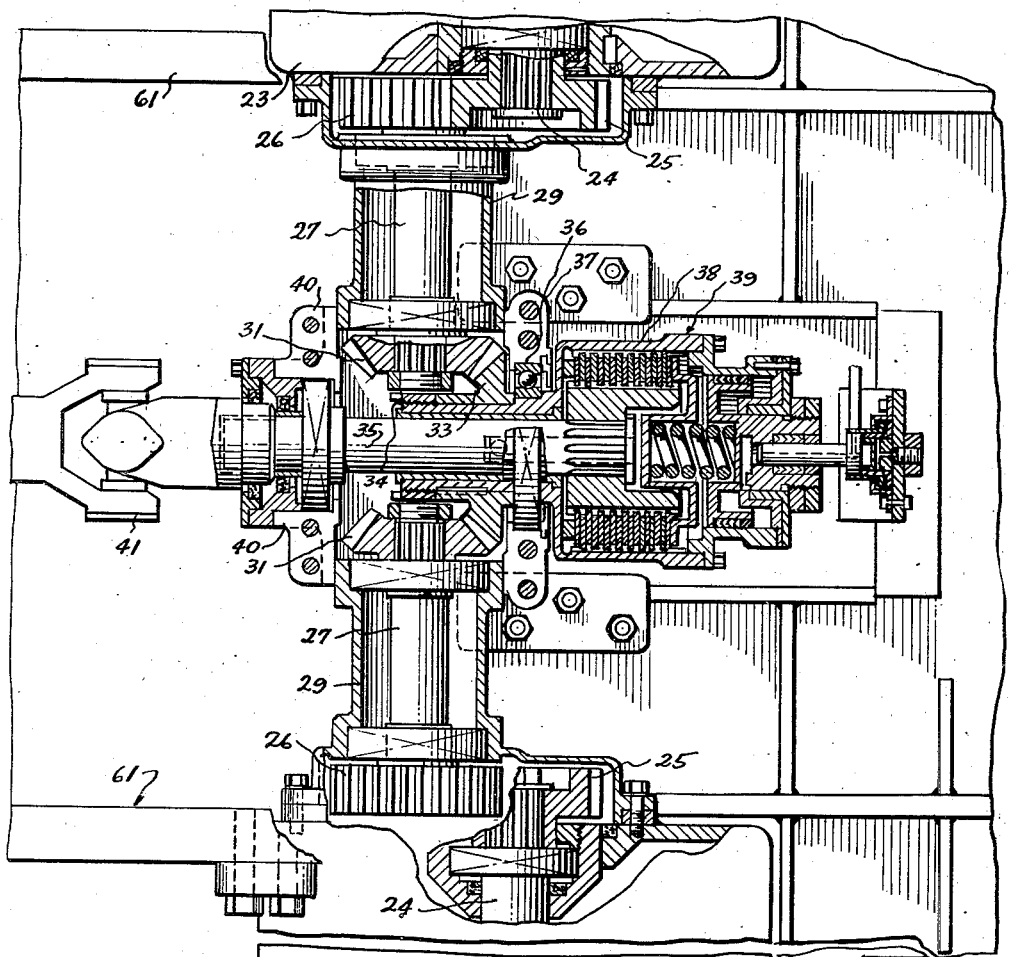
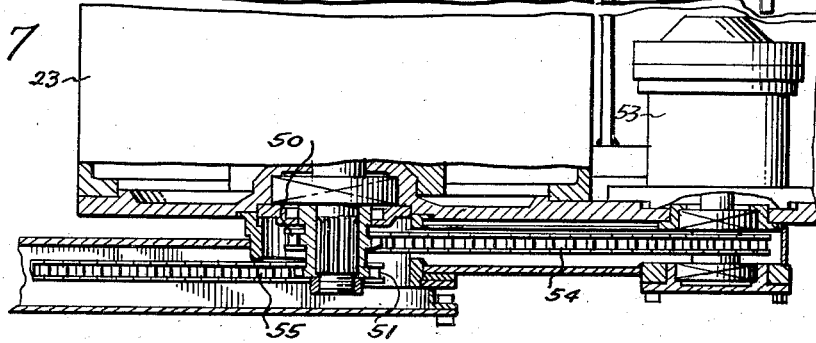
Fig. 7

April 8, 1947.   F. CARTLIDGE   2,418,573
MATERIAL GATHERING AND LOADING MACHINE
Original Filed Aug. 2, 1943   8 Sheets-Sheet 7

INVENTOR
Frank Cartlidge
Clarence F. Poole
ATTORNEY

April 8, 1947. F. CARTLIDGE 2,418,573
MATERIAL GATHERING AND LOADING MACHINE
Original Filed Aug. 2, 1943 8 Sheets-Sheet 8

INVENTOR
Frank Cartlidge
Clarence F. Poole
ATTORNEY

Patented Apr. 8, 1947

2,418,573

UNITED STATES PATENT OFFICE 2,418,573

MATERIAL GATHERING AND LOADING MACHINE

Frank Cartlidge, Chicago, Ill., assignor to Goodman Manufacturing Company, Chicago, Ill., a corporation of Illinois Original application August 2, 1943, Serial No. 497,004. Divided and this application February 23, 1945, Serial No. 579,396

6 Claims. (Cl. 198—8)

This invention relates to improvements in material gathering and loading machines particularly adapted to load coal at the working face of a mine underground, and is a division of application Serial No. 497,004, filed August 2, 1943, and now Patent No. 2,388,385.

The principal objects of my invention are to provide a new and improved simple and efficient loading machine of a low overall height suitable for operation in thin seams of coal and arranged with a view towards increased maneuverability and capacity, together with increased accessibility to the operating parts of the machine, and compactness and simplicity in construction.

Other objects of my invention will appear from time to time as the following specification proceeds and with reference to the accompanying drawings wherein:

Figure 3 is an enlarged view in side elevation of the front part of the machine, with certain parts thereof shown in substantially longitudinal section;

Figure 4 is a fragmentary view in side elevation of the front part of the machine, drawn to substantially the same scale as Figure 2, but with certain other parts shown in longitudinal section than are shown in Figure 2, in order to illustrate the drive to the gathering devices;

Figure 8:
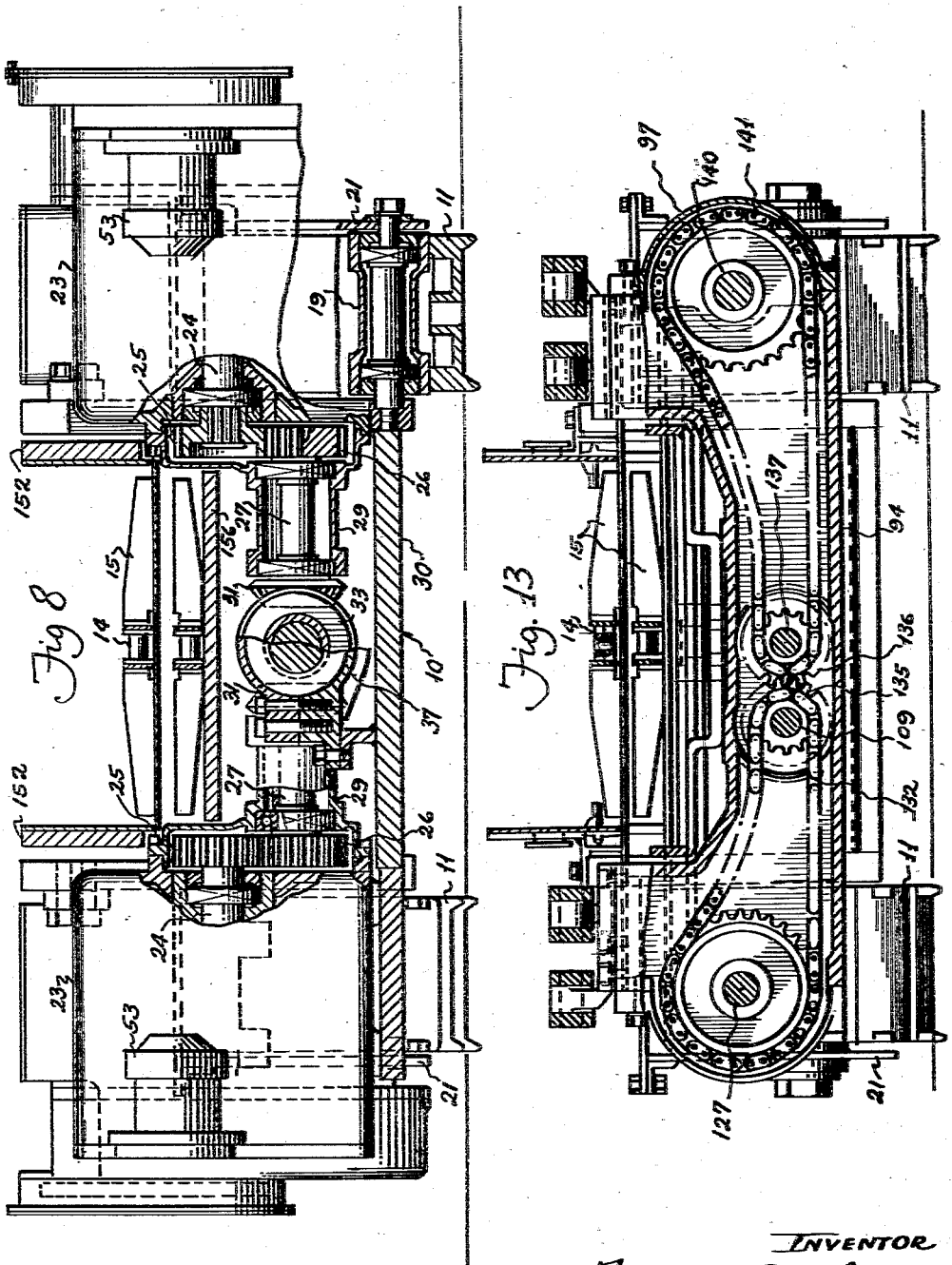
Figure 9:
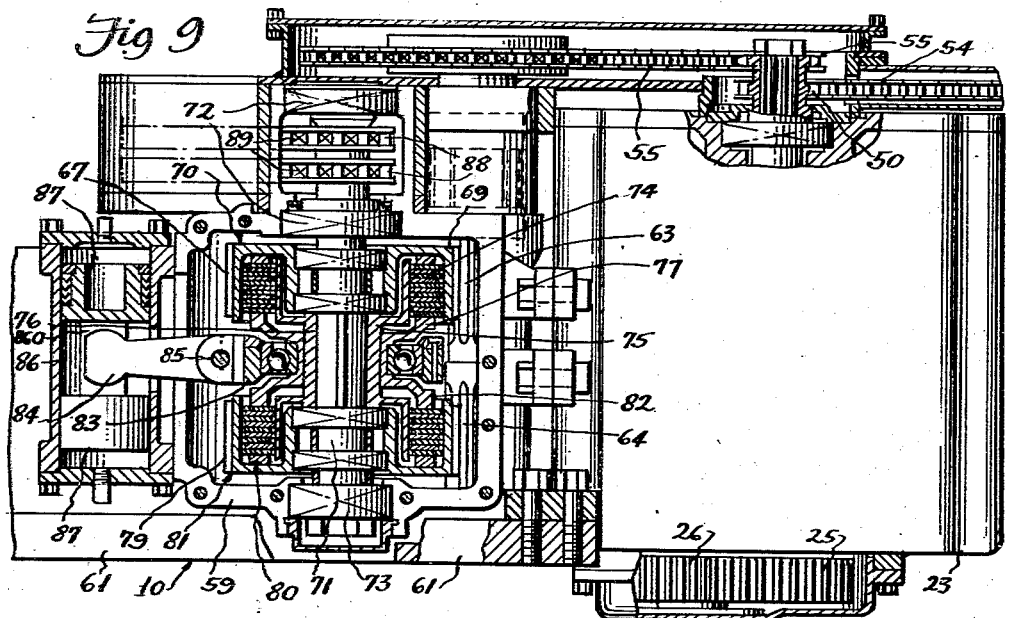
Figure 10:
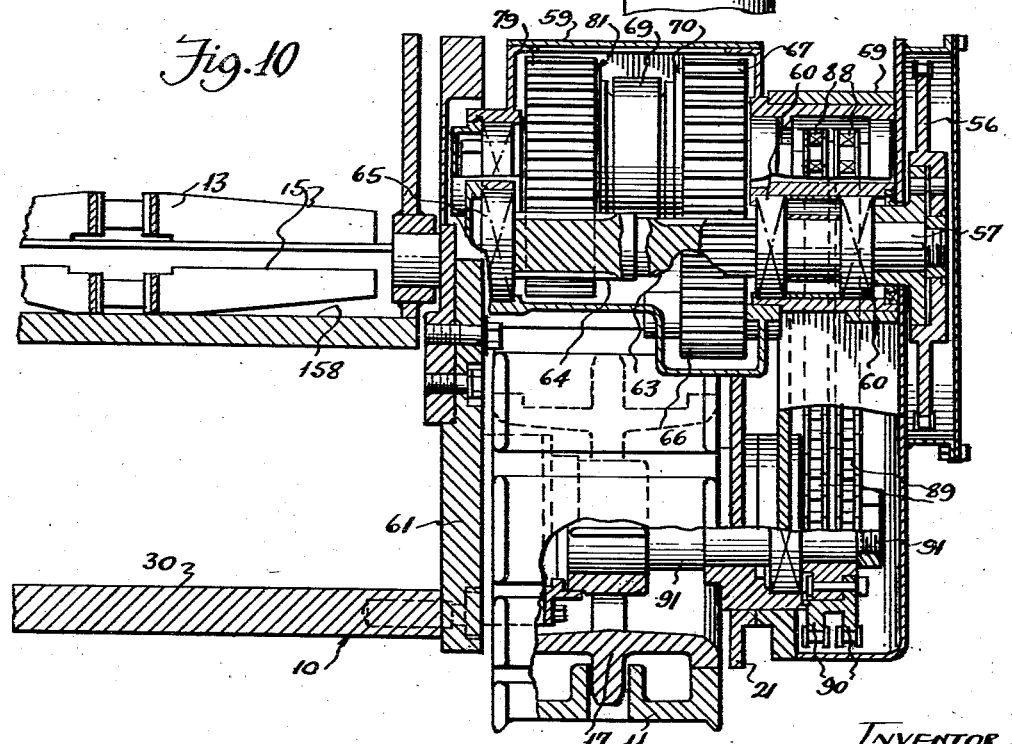

Figure 5 forms a continuation of Figure 3 and is a view in side elevation of the central part of the machine, with certain parts broken away and certain other parts shown in substantially longitudinal section;

Figure 6 is a continuation of Figure 5 and is a view in side elevation of the rear part of the machine, showing certain parts of the machine broken away and certain other parts in longitudinal section;

Figure 7 is an enlarged detail fragmentary plan view of the rear part of the machine, with the conveyer removed and certain parts broken away and certain other parts shown in horizontal section, in order to illustrate certain details of the drive to certain of the operating parts of the machine;

Figure 8 is a transverse sectional view illustrating certain details of the drive to certain operating parts of the machine not shown in Figure 7;

Figure 9 is an enlarged detail partial fragmentary plan view with certain parts broken away and certain other parts shown in horizontal section, showing certain details of the drive to one of the continuous tread devices;

Figure 10 is a partial fragmentary transverse sectional view taken through the drive to one of the continuous tread devices and showing certain details of the machine not shown in Figure 9;

Figure 11 is a partial fragmentary longitudinal sectional view showing certain details of the drive to one of the continuous tread devices not shown in Figures 9 and 10;

Figure 12 is a partial fragmentary longitudinal sectional view showing certain other details of the drive to one of the continuous tread devices than are shown in Figures 9, 10 and 11; and Figure 13 is a transverse sectional view taken substantially along line 13—13 of Figure 3 and illustrating certain details of the drive to the gathering mechanism.

Referring now to the details of the embodiment of my invention illustrated in the drawings, the main elements of the machine consist of a main frame 10 mounted on a pair of laterally spaced continuous tread devices 11, 11. An inclined gathering element or loading head 12 is disposed in advance of said main frame, and a conveyer 13 extends from said gathering element rearwardly over the main frame and beyond the rear end of the latter in an overhanging position, so as to discharge material into mine cars or the like. Said conveyer is herein shown as being of a single center strand endless chain and flight type including an endless chain 14 having spaced apart flights 15, 15 secured thereto and projecting laterally therefrom in opposite directions.

The continuous tread devices 11, 11 are suitably mounted at opposite sides of the main frame on drive sprockets 17, 17 near the rear end of the frame, and on idler sprockets 18, 18 at the front of the frame. A plurality of intermediate bogie wheels 19, 19 engage the underside of the lower run of said tread devices. Said sprockets and bogie wheels are supported on suitable shafts which have bearing at their inner ends on the main frame and at their outer ends in overhanging brackets 21, 21 at opposite sides of the main frame (see Figures 2, 5, 8, and 10). Details of the endless tread structures and their supporting means need not here be described further as they form no part of the present invention.

The gathering element 12, conveyer 13, and continuous tread device 11, 11 are driven from a pair of connected motors 23, 23, mounted on opposite sides of the main frame 10, just rearwardly of the tread devices 11, 11. Said motors project laterally from opposite sides of the conveyer 13 and are each provided with a transversely extending motor shaft 24 having a motor pinion 25 on the inner end thereof. Said pinions each mesh with a spur gear 26 on the outer end of a transversely extending shaft 27. Said shafts are coaxially arranged and are journaled in housing and bearing supports 29, 29, spaced upwardly from a bottom plate 30 of the main frame 10 and herein shown as being supported thereon and secured to and projecting inwardly from the end plates of the motors 23, 23. A bevel pinion 31 is secured to the inner end of each of said shafts. Said bevel pinions mesh with a bevel gear 33 keyed to a sleeve 34, mounted on a longitudinally extending shaft 35 for free rotation with respect thereto. Said bevel gear connects said motors together to operate as a unit.

The sleeve 34 is also mounted on a ball bearing 36 mounted in a bearing support 37, suitably mounted on the main frame 10. Said sleeve has a casing 38 of a friction clutch 39 formed integrally therewith, and forms a drive means for said clutch. Said clutch is herein shown as being a friction disk clutch and is controlled by suitable fluid control means, not herein described since they are no part of my present invention, to selectively connect said bevel gear 33 and sleeve 34 to said shaft 35 and to slip to relieve said motors 23, 23 from overload conditions when the loads on said shaft are over a predetermined value.

The shaft 35 is journaled in a bearing support 40 at its forward end and forms a means for driving the gathering mechanism 12 and conveyer 13 through a universal coupling 41 and a longitudinally extending shaft 42, extending through a tubular opening 43 formed in a tank 44 for storing fluid for the fluid operating parts of the machine. A universal coupling 45 connects the forward end of said shaft with a longitudinally extending shaft 46 mounted adjacent the forward end of said main frame on ball bearings 47, 47. A bevel pinion 49 on the forward end of said shaft forms a means for driving said gathering elements and conveyer in all positions of said gathering elements with respect to said main frame, in a manner which will hereinafter be described as this specification proceeds.

It should here be noted that the tube 43 extending through the fluid storage tank 44 prevents the shaft 42 from dropping, when the shaft 35 is removed from the universal coupling 41, so said shaft may readily be connected with said universal coupling during assembly or repair of the machine, it being understood that the clutch 39 and shaft 35 are removed as a unit by sliding rearwardly along the bottom plate 30 of the main frame 10.

The end of each motor shaft 24, opposite from the pinion 25, is splined and has a pair of integrally formed drive sprockets 50 and 51 mounted thereon. The drive sprocket 50 serves to drive a fluid pump 53 through a chain and sprocket drive 54 (see Figure 7). Said fluid pump may be of any well known form and is provided to supply fluid under pressure to the fluid operating parts of the machine.

The other drive sprocket 51 serves to drive one of the continuous tread devices through a drive chain 55, meshing therewith, and meshing with a sprocket 56 on a transversely extending shaft 57. The drive from each motor 23 to each continuous tread device is the same, so the drive to one of said tread devices only will herein be described in detail. The transverse shaft 57 is journaled in a housing and bearing support 59 on spaced ball bearings 60, 60 and extends inwardly from said sprocket towards side plate 61 of the main frame 10 (see Figures 9 and 10). Said shaft has two spur pinions 63 and 64 formed integrally therewith, the pinion 64 being of a larger diameter than the pinion 63 (see Figures 11 and 12). The inner end of said shaft is journaled in a ball bearing 65 mounted on the inner end of said housing and bearing support 59. The spur pinion 63 meshes with an idler gear 66 journaled in said housing and bearing support, and meshing with a spur gear 67, herein shown as being formed integrally with a housing 69 for a clutch 70. Said clutch housing is journaled on a transversely extending shaft 71, supported adjacent its outer end in the housing and bearing support 59, on a pair of spaced ball bearings 72, 72 and journaled at its inner end in said housing and bearing support on a ball bearing 73.

The clutch 70 may be of any well known form but, as herein shown, is of a friction disk type including a plurality of interengaging friction disks 74, 74, alternate disks of which are splined to the inner periphery of the housing 69. The other disks are splined on an inwardly projecting portion 75 of a drive member 76, keyed on the shaft 71 intermediate the ends thereof. An engaging member 77 is slidably mounted on said drive member and is adapted to engage the disks 74, 74, to cause said housing to drive said drive member in a manner well known to those skilled in the art.

The spur pinion 64 meshes with and drives a spur gear 79 herein shown as being formed integrally with the outer periphery of a casing 80 of a clutch 81, journaled on the shaft 71. Said clutch is similar to the clutch 70 and is provided with an engaging member 82, adjacent and coaxial with and herein shown as being formed integrally with the engaging member 77, to engage said clutch 81 in the usual manner and drive the drive member 76 and shaft 71 in a reverse direction from which it is driven from the clutch 70.

A shifting collar 83, journaled on the engaging members 77 and 82, is provided to shift said members along the drive member 76, to engage or disengage either of the clutches 70 or 81 (see Figures 9 and 11). Said shifting collar is operated by means of a clutch yoke 84, pivotally connected to opposite sides of said shifting collar and pivoted intermediate its ends on a vertical pivotal pin 85. The free end of said clutch yoke extends within a cylinder 86 and is operatively connected with a member 86a. Said member 86a is connected between a pair of spaced pistons 87, 87 which are mounted in opposite ends of said cylinder. Suitable fluid pressure connections are provided to opposite ends of said cylinder for supplying fluid to opposite ends of said cylinder and operating said clutch fork and shifting yoke, so as to selectively engage one clutch and permit the other to be released, to provide a simplified form of reverse drive for the shaft 71.

The shaft 71 has a pair of spaced drive sprockets 88, 88 keyed thereto between the ball bearings 72, 72. Drive chains 89, 89 meshing with said sprockets, mesh with and drive sprockets 90, 90 on the outer end of a transverse shaft 91. Said transverse shaft has the drive sprocket 17 mounted thereon, for driving said drive sprocket and the associated continuous tread device 11.

Separate fluid control valves (not shown) are provided to control the admission and release of fluid under pressure to each end of each cylinder 86, so the continuous tread devices 11, 11 may be independently driven from the motors 23, 23 in reverse directions, without reversing the direction of rotation of said motors. Said fluid control valves and the fluid connections to said cylinders will not herein be shown or described, since they form no part of my present invention.

The gathering and loading element 12 is supported for vertical tilting movement on a frame 93, the upper portion of which forms an inclined trough for the receiving end of the conveyer 13. Said frame is transversely pivoted adjacent its rear end on the forward end of a laterally swinging frame 94, on the outer peripheries of transversely extending bearing support bosses 95, 95, the insides of which bosses form bearing supports for a transverse drive shaft 96, coaxial with the horizontal pivotal axis of swinging frame 93 (see Figures 2 and 5). Said transverse shaft forms a drive shaft for the conveyer chain 14.

The laterally swinging frame 94 has a widened forward portion 97 slidably mounted on and projecting forwardly of the forward end of the bottom plate 30 of the main frame 10. The rear portion of said laterally swinging portion converges to a pair of vertically spaced hollow upright bosses 98, 99. The lower of said bosses 98 is mounted on a lower end of a vertical shaft or pivot post 100, secured to the bottom plate 30 and projecting upwardly therefrom. The upper of said bosses 99 is rotatably mounted on the outside of a depending hollow boss 101, herein shown as being formed integrally with a transversely extending plate 103 extending across the upper portion of the main frame 10 (see Figure 5).

The shaft 100 is secured at its upper end to the transverse plate 103 as by a nut 104, and has a bevel gear 105 journaled thereon. Said bevel gear is meshed with and driven from the bevel pinion 49 on the forward end of the longitudinal shaft 46, and meshes with and drives a bevel pinion 107, keyed on the rear end of a longitudinal shaft 109. Said longitudinal shaft is journaled in the swinging frame 94 on ball bearings 111, 111, mounted in a bearing support 112 and in a ball bearing 113 mounted in an end cap piece 114 secured to said frame. Said shaft 109 forms a means for driving the gathering mechanism of the loader head 12 and the conveyer 13, as will hereinafter be described.

Figure 1:
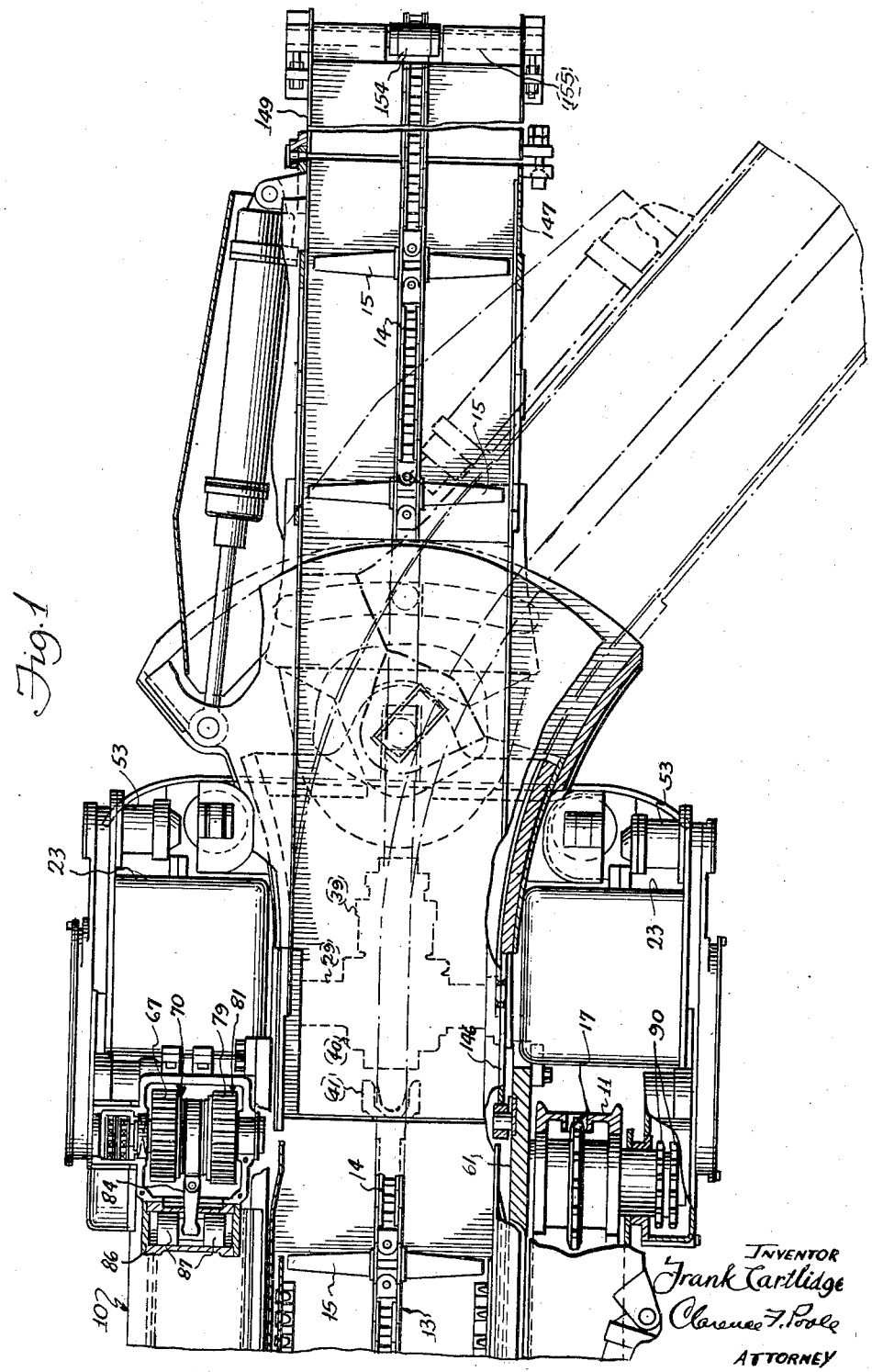
Figure 1 is a top plan view of the rear part of a loading machine constructed in accordance with my invention, with certain parts broken away and certain other parts shown in section.
Figure 2:
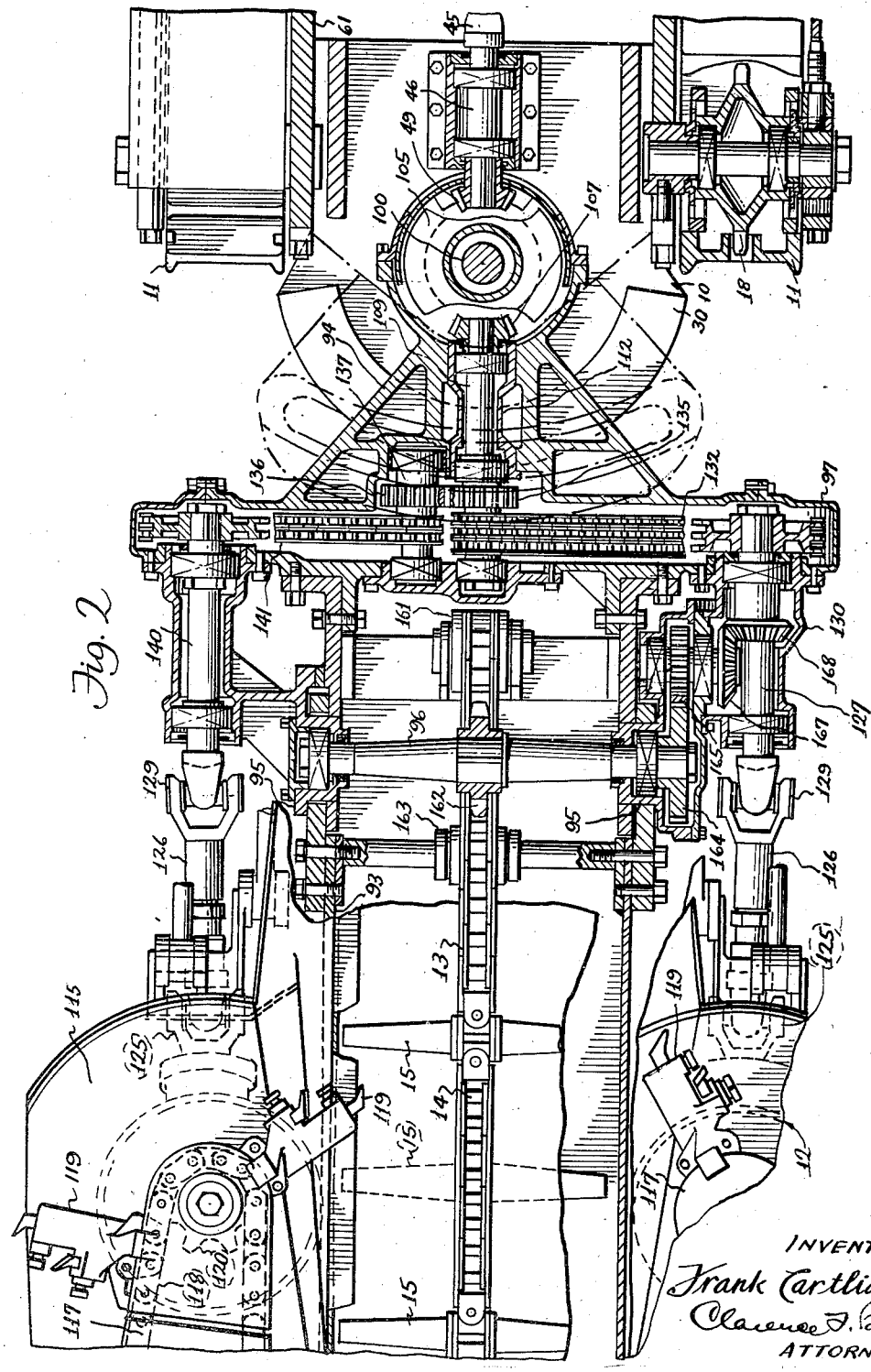
Figure 2 is a plan view of the front part of the machine shown in Figure 1, with certain parts broken away and certain other parts shown in section.

The gathering element 12 herein shown is of a well known type and includes an inclined apron 115 mounted on the forward upper end of the frame 93 and extending thereacross and across the front end of the conveyer 13 (see Figures 2 and 4). A pair of chain guiding members 117, 117 having endless chains 118, 118 guided for orbital movement thereabout are mounted on the top side of said plate as usual, so as to extend along opposite sides of and forwardly of said conveyer. A plurality of gathering arms 119, 119 are carried by said endless chains for picking up material from the ground and moving it along the forward portion of said apron onto the conveyer.

The gathering chains 118, 118 mesh with and are driven from sprockets 120, 120, herein shown as being splined on the upper ends of vertical shafts 121, 121. Said shafts are journaled in the frame 93 beneath the apron 115 in a well known manner, and have bevel gears 122, 122 keyed thereto and meshing with and driven from bevel gears 123, 123 on the forward ends of longitudinal shafts 124, 124 (see Figure 4).

The drive to the left-hand gathering element and longitudinal shaft 124 includes a universal coupling 125 secured to the rear end of each shaft 124, for driving said shaft from an extensible drive shaft 126. The rear end of said extensible drive shaft is connected with a longitudinal shaft 127 by means of a universal coupling 129. Said longitudinal shaft 127 is journaled in a housing and bearing support 130 secured to and projecting forwardly from the forward end of the widened portion 97 of said swinging frame 94. A chain and sprocket drive 132 connects said shaft with the longitudinal shaft 109.

The drive to the right-hand gathering element is similar to the drive to the gathering element just described except that a spur gear 135 keyed on the longitudinal shaft 109 meshes with and drives a spur gear 136 on a parallel shaft 137. Said last mentioned shaft has drive connection with a parallel shaft 140, which is journaled in the right-hand widened portion 97 of the swinging frame 94, through a chain and sprocket drive indicated generally by reference character 141. The drive from said longitudinal shaft to the right-hand gathering element is the same as that just described in connection with the left-hand gathering element, so the same part numbers will be applied to like parts and the description thereof will not herein be repeated.

The conveyer 13, which extends continuously from the gathering element 12 to the rear end of the machine, consists generally of a plurality of aligned trough sections including an inclined front trough section 143 extending along the intermediate frame 93 and tiltable therewith about the axis of the transverse shaft 96; a horizontal trough section 144 mounted on and swinging laterally with the swinging frame 94; a horizontal trough section 145 fixed on and extending across the top of the main frame 10; a vertically tilting trough section 146 connected thereto on a transverse axis near the rear end of the main frame; a laterally swinging trough section 147 pivotally connected to the rear end of the trough section 146 and overhanging the rear end of the machine; and finally, an overhanging vertically tilting trough section 149 transversely pivoted to the rear end of said laterally swinging trough section 147.

The endless chain 14 extends from an idler 150 mounted on a transverse shaft 151 at the front of the machine, upwardly along a bottom plate 153 of the inclined trough section 143. From thence it extends along the trough sections 144, 145, 146, 147 and 149, to and around an idler 154 on a transverse shaft 155 at the rear of the machine. Said chain reverses its direction of travel around said idler and extends forwardly from said idler beneath the bottom of the material carrying portion of the conveyer and its return run is slidably supported on a supporting plate 156, spaced beneath the material carrying portion of said vertically tilting section. From thence said chain extends along supporting plates 157, 158, 159 and 160 of the respective trough sections 147, 146, 145 and 144. Said chain extends from said last mentioned plate over an idler 161 disposed rearwardly of the transverse shaft 96 (see Figure 3). From said idler roller said chain extends downwardly and around a drive sprocket 162 keyed on said transverse shaft 96 and over an idler roller 163, to and around the idler 150 at the front end of the inclined trough 143.

The drive to the transverse shaft 96 and drive sprocket 152 includes a spur gear 164 on said transverse shaft, which meshes with and is driven from a spur gear 165 on a parallel transverse shaft 166 disposed at the left-hand side of the machine (see Figure 2). A bevel gear 167 is keyed on the outer end of said transverse shaft and meshes with and is driven from a bevel gear 168 keyed on the longitudinal shaft 127. Suitable take-up means are provided for the front and rear portions of the conveyer to maintain a substantially constant tension on the conveyer chain in all positions of lateral adjustment of the forward and rear ends of the conveyer. Said take-up means are clearly shown and described in my application Serial No. 497,004 of which this is a division, and are no part of the present invention so will not be described herein.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a low type loading machine, a main frame, a pair of laterally spaced continuous tread devices for supporting and propelling said main frame along the ground, an inclined elevating conveyer extending from the ground in advance of said main frame, gathering devices projecting forwardly from opposite sides of the forward end of said conveyer, for picking up material from the ground and discharging it onto said conveyer, and means for independently driving said conveyer, gathering devices and continuous tread devices including two motors disposed on opposite sides of the machine, rearwardly of said continuous tread devices and having transversely disposed armature shafts, selective drive connections from the outer ends of said armature shafts to said continuous tread devices, drive gearing connecting the inner ends of said armature shafts together, to connect said motors to operate as a unit, a shaft extending longitudinally of said main frame, a drive connection to said longitudinal shaft from said drive gearing connecting said armature shafts together, and drive connections from said longitudinal shaft to said conveyer and said gathering devices, for driving said conveyer and said gathering devices from said motors independently of said continuous tread devices including another longitudinal shaft spaced adjacent the forward end of said main frame and at a lower level than said first mentioned longitudinal shaft, and coupling means connecting said shafts together.

2. In a low type loading machine, a main frame, a pair of laterally spaced continuous tread devices for supporting and propelling said main frame along the ground, a continuous inclined elevating conveyer extending from the ground in advance of said main frame, gathering devices projecting forwardly from opposite sides of the forward end of said conveyer, for picking up material from the ground and discharging it onto said conveyer, and means for independently driving said conveyer, gathering devices and continuous tread devices including two motors disposed on opposite sides of the machine rearwardly of said continuous tread devices and having transversely disposed armature shafts, selective drive connections from the outer ends of said armature shafts to said tread devices, drive gearing connecting the inner ends of said armature shafts together, to connect said motors to operate as a unit, including a pair of facing coaxial bevel gears, a third bevel gear meshing therewith, and a drive connection from said last mentioned bevel gear to said conveyer and said gathering devices including a shaft coaxial with said last mentioned bevel gear and extending longitudinally of said main frame, another longitudinal shaft spaced adjacent the forward end of said main frame and at a lower level than said first mentioned longitudinal shaft, drive connections from said last mentioned shaft to said gathering devices and to said conveyer, and a universal drive connection connecting said longitudinal shafts together.

3. In a low type loading machine, a main frame, a pair of laterally spaced continuous tread devices for supporting and propelling said main frame along the ground, an inclined elevating conveyer extending from the ground in advance of said main frame, gathering devices projecting forwardly from opposite sides of the forward end of said conveyer, for picking up material from the ground and discharging it onto said conveyer, and means for independently driving said conveyer, gathering devices and continuous tread devices including two motors disposed on opposite sides of the machine rearwardly of said continuous tread devices and having transversely disposed armature shafts, selective drive connections from the outer ends of said armature shafts to said tread devices, drive gearing disposed beneath the lower run of said conveyer for connecting said motors together to operate as a unit including a gear housing disposed between said motors and mounted on said main frame for removal from the rear end thereof, two coaxial transverse shafts journaled in said gear housing, geared drive connections from said motors to said shafts, a bevel gear on the inner end of each of said shafts, a third bevel gear meshing with said first mentioned bevel gears and journaled in said housing for rotation about an axis extending longitudinally of the machine, a longitudinal shaft journaled in said housing and extending forwardly of said bevel gear, and drive connections from said shaft to said conveyer and said gathering devices including a longitudinal shaft disposed adjacent the forward end of said main frame and at a lower level than said first mentioned longitudinal shaft, and a universal drive connection connecting said shafts together.

4. In a low type loading machine, a main frame, a pair of laterally spaced continuous tread devices for supporting and propelling said main frame along the ground, an inclined elevating conveyer extending from the ground in advance of said main frame, gathering devices projecting forwardly from opposite sides of the forward end of said conveyer, for picking up material from the ground and discharging it onto said conveyer, and means for independently driving said conveyer, gathering devices and continuous tread devices including two motors disposed on opposite sides of the machine rearwardly of said continuous tread devices and having transversely disposed armature shafts, selective drive connections from the outer ends of said armature shafts to said tread devices, drive gearing disposed beneath the lower run of said conveyer for connecting said motors together to operate as a unit including two coaxial transverse shafts, geared drive connections from said motors to said shafts, a bevel gear on the inner end of each of said shafts, a third bevel gear rotatable about an axis extending longitudinally of the machine and driven from said first mentioned bevel gears, a longitudinal shaft driven by said last mentioned bevel gear, and drive connections from said shaft to said conveyer and said gathering devices including a longitudinal shaft disposed adjacent the forward end of said main frame and at a lower level than said first mentioned longitudinal shaft, a universal drive connection connecting said shafts together, said universal drive connection including a shaft having a universal coupling on each end thereof and extending through a storage tank for storing fluid for certain operative parts of the machine, and said storage tank serving to prevent said last mentioned shaft from dropping when disconnected from its universal joints, to facilitate assembly and disassembly of the apparatus.

5. In a low type loading machine, a main frame, a pair of laterally spaced continuous tread devices for supporting and propelling said main frame along the ground, an inclined elevating conveyer extending from the ground in advance of said main frame, gathering devices projecting forwardly from opposite sides of the forward end of said conveyer, for picking up material from the ground and discharging it onto said conveyer, and means for independently driving said conveyer, gathering devices and continuous tread devices including two motors disposed on opposite sides of the machine rearwardly of said continuous tread devices and having transversely disposed armature shafts, selective drive connections from the outer ends of said armature shafts to said tread devices, drive gearing disposed beneath the lower run of said conveyer for connecting said motors together to operate as a unit including a gear housing disposed between said motors and mounted on said main frame for removal from the rear end thereof, two coaxial transverse shafts journaled in said gear housing, geared drive connections from said motors to said shafts, a bevel gear on the inner end of each of said shafts, a third bevel gear meshing with said first mentioned bevel gears and journaled in said housing for rotation about an axis extending longitudinally of the machine, a longitudinal shaft journaled in said housing and extending forwardly of said bevel gear, and drive connections from said shaft to said conveyer and said gathering devices including a longitudinal shaft disposed adjacent the forward end of said main frame and at a lower level than said first mentioned longitudinal shaft and a universal drive connection connecting said shafts together, said universal drive connection including a longitudinal shaft inclined towards the ground and having a universal coupling on each end thereof, and means for preventing said shaft from dropping to the floor of said main frame upon removal of said universal coupling on the rear end thereof to permit ready removal of said gear housing and gears therein from the rear of the machine and to permit assembly of said gear housing and gears and ready connection of said rearward universal coupling to the rear of said inclined longitudinal shaft.

6. In a low type loading machine, a main frame, a pair of laterally spaced continuous tread devices for supporting and propelling said main frame along the ground, a fluid storage tank for storing fluid for operating certain operating parts of the machine, an inclined elevating conveyer extending from the ground in advance of said main frame, gathering devices projecting forwardly from opposite sides of the forward end of said conveyer, for picking up material from the ground and discharging it onto said conveyer, and means for independently driving said conveyer, gathering devices and continuous tread devices including two motors disposed on opposite sides of the machine rearwardly of said continuous tread devices and having transversely disposed armature shafts, selective drive connections from the outer ends of said armature shafts to said tread devices, drive gearing disposed beneath the lower run of said conveyer for connecting said motors together to operate as a unit including a gear housing disposed between said motors and mounted on said main frame for removal from the rear end thereof, two coaxial transverse shafts journaled in said gear housing, geared drive connections from said motors to said shafts, a bevel gear on the inner end of each of said shafts, a third bevel gear meshing with said first mentioned bevel gears and journaled in said housing for rotation about an axis extending longitudinally of the machine, a longitudinal shaft journaled in said housing and extending forwardly of said bevel gear, and drive connections from said shaft to said conveyer and said gathering devices including a longitudinal shaft disposed adjacent the forward end of said main frame and at a lower level than said first mentioned longitudinal shaft and a universal drive connection connecting said shafts together, said universal drive connection including a shaft having a universal coupling on each end thereof, and a conduit extending longitudinally through said fluid storage tank and secured to said tank to prevent the passage of fluid therefrom and providing an opening through said tank having said last mentioned longitudinal shaft extending therethrough, to prevent said shaft from dropping to the floor of said main frame upon removal of said universal coupling at the rear end of said shaft, to permit ready removal of said gear housing and gears therein from the rear of the machine and to permit ready connection of said universal coupling at the rear end of said shaft extending through said conduit to the forward end of said longitudinal shaft journaled in said gear housing, upon assembly of the machine.

FRANK CARTLIDGE.

REFERENCES CITED

The following references are of record in the file of this patent:

UNITED STATES PATENTS

| Number | Name | Date |
| --- | --- | --- |
| 2,024,458 | Kraft | Dec. 17, 1935 |
| 2,206,828 | Sloane | July 2, 1940 |
| 2,334,605 | Cartlidge | Nov. 16, 1943 |